United States Patent
Ollikainen et al.

(10) Patent No.: US 11,406,110 B2
(45) Date of Patent: Aug. 9, 2022

(54) WHEY PROTEIN CONCENTRATE, ACIDIFIED MILK PRODUCTS COMPRISING THE CONCENTRATE AND METHODS THEREFOR

(71) Applicant: VALIO LTD, Helsinki (FI)

(72) Inventors: Pia Ollikainen, Helsinki (FI); Riitta Partanen, Helsinki (FI); Saara Laiho, Helsinki (FI)

(73) Assignee: VALIO LTD., Helsinki (FI)

( * ) Notice: Subject to any disclaimer, the term of this patent is extended or adjusted under 35 U.S.C. 154(b) by 732 days.

(21) Appl. No.: 15/538,381

(22) PCT Filed: Dec. 22, 2015

(86) PCT No.: PCT/FI2015/050926
§ 371 (c)(1),
(2) Date: Jun. 21, 2017

(87) PCT Pub. No.: WO2016/102774
PCT Pub. Date: Jun. 30, 2016

(65) Prior Publication Data
US 2017/0347673 A1 Dec. 7, 2017

(30) Foreign Application Priority Data
Dec. 22, 2014 (FI) .................................. 20146133

(51) Int. Cl.
*A23C 9/123* (2006.01)
*A23C 21/06* (2006.01)
(Continued)

(52) U.S. Cl.
CPC ............ *A23C 9/123* (2013.01); *A23C 9/1307* (2013.01); *A23C 9/1422* (2013.01);
(Continued)

(58) Field of Classification Search
CPC .............................. A23C 9/1307; A23C 21/06
See application file for complete search history.

(56) References Cited

U.S. PATENT DOCUMENTS

| 5,217,741 A | 6/1993 | Kawachi et al. |
| 5,714,182 A | 2/1998 | Bisson et al. |

(Continued)

FOREIGN PATENT DOCUMENTS

| DK | 1 142 482 | * 10/2001 |
| EP | 0 184 267 | 6/1986 |

(Continued)

OTHER PUBLICATIONS

University of Guelph, "Raw milk quality/4.1 The Principal Milk Components"—https://www.uoguelph.ca/foodscience/book/export/html/1964, 1964, downloaded Apr. 27, 2020. (Year: 1964).*

(Continued)

*Primary Examiner* — Elizabeth Gwartney
(74) *Attorney, Agent, or Firm* — Robert P. Michal, Esq.; Carter, DeLuca & Farrell LLP

(57) ABSTRACT

The present invention relates to a method of producing an ideal whey protein concentrate. The whey protein concentrate has a pH in the range of 6.8-7.5 and 70-90% of the total proteins of the concentrate are whey proteins and 10-30% of the total proteins of the concentrate are caseins. The present invention relates also to an ideal whey protein concentrate and its uses in in reducing the total milk protein content and/or in increasing the whey protein content of a spoonable acidified milk product. In addition, the present invention relates to a method of producing a spoonable acidified milk product having high whey protein content but a reduced total milk protein content. The present invention relates also to a spoonable acidified milk product having high whey protein content but a reduced total milk protein content.

19 Claims, 1 Drawing Sheet

(51) Int. Cl.
*A23J 3/08* (2006.01)
*A23J 1/20* (2006.01)
*A23C 19/09* (2006.01)
*A23C 9/13* (2006.01)
*A23C 9/142* (2006.01)
*A23C 19/076* (2006.01)

(52) U.S. Cl.
CPC .......... *A23C 19/0917* (2013.01); *A23C 21/06* (2013.01); *A23J 1/205* (2013.01); *A23J 3/08* (2013.01); *A23C 19/076* (2013.01)

(56) References Cited

U.S. PATENT DOCUMENTS

| | | | |
|---|---|---|---|
| 2002/0031600 A1 | 3/2002 | Sato et al. | |
| 2002/0164401 A1 | 11/2002 | Sato et al. | |
| 2011/0097442 A1* | 4/2011 | Harju | A61P 3/10 426/41 |

FOREIGN PATENT DOCUMENTS

| | | |
|---|---|---|
| JP | 5-64550 | 3/1993 |
| JP | 7-111860 | 5/1995 |
| JP | 3073236 | 8/2000 |
| RU | 2012 121 886 A | 12/2013 |
| WO | WO 97/05784 | 2/1997 |
| WO | WO 2005/016015 | 2/2005 |
| WO | WO 2005/041677 | 5/2005 |
| WO | WO 2006/068505 | 6/2006 |
| WO | WO 2008/092458 | 8/2008 |
| WO | WO 2009/108074 | 9/2009 |
| WO | WO 2010/085957 | 1/2010 |
| WO | WO 2011/051557 | 5/2011 |
| WO | WO 2012/110705 | 8/2012 |
| WO | WO 2013/009182 | 1/2013 |
| WO | WO 2013/068653 | 5/2013 |
| WO | WO 2014/087054 | 6/2014 |

OTHER PUBLICATIONS

Office Action issued in KR Appln. No. 10-2017-7020342 dated Sep. 27, 2018 (w/ translation).

Augustin et al., "Use of blends of skim milk and sweet whey protein concentrates in reconstituted yogurt," *The Australian Journal of Dairy Technology*, vol. 58, No. 1: pp. 30-35 (Apr. 2003).

Kailasapathy al., "Effect of partially replacing skim milk powder with whey protein concentrate on the sensory qualities of lactose hydrolysed acidophilus yogurt," *Milchwissenschaft*, vol. 53, No. 7: pp. 385-389 (1998).

Puvanenthiran et al., "Structure and visco-elastic properties of set yoghurt with altered casein to whey protein ratios," *International Dairy Journal*, vol. 12: pp. 383-391 (2002).

Sodini et al., "Physical properties of yogurt fortified with various commercial whey protein concentrates," *Journal of the Science of Food and Agriculture*, vol. 85: pp. 853-859 (2005).

Van Hekken et al., "Use of cold microfiltration to produce unique β-casein enriched milk gels," *Le Lait*, vol. 80, No. 1: pp. 69-76 (2000), <<https://hal.archives-ouvertes.fr/hal-00895388/document>>.

Finnish Office Action issued in Appln. No. 20146133 dated Aug. 21, 2015.

Finnish Search Report issued in Appln. No. 20146133 dated Aug. 21, 2015.

International Preliminary Report on Patentability issued in PCT/FI2015/050926 dated Mar. 30, 2017.

International Search Report issued in PCT/FI2015/050926 dated Mar. 11, 2016.

\* cited by examiner

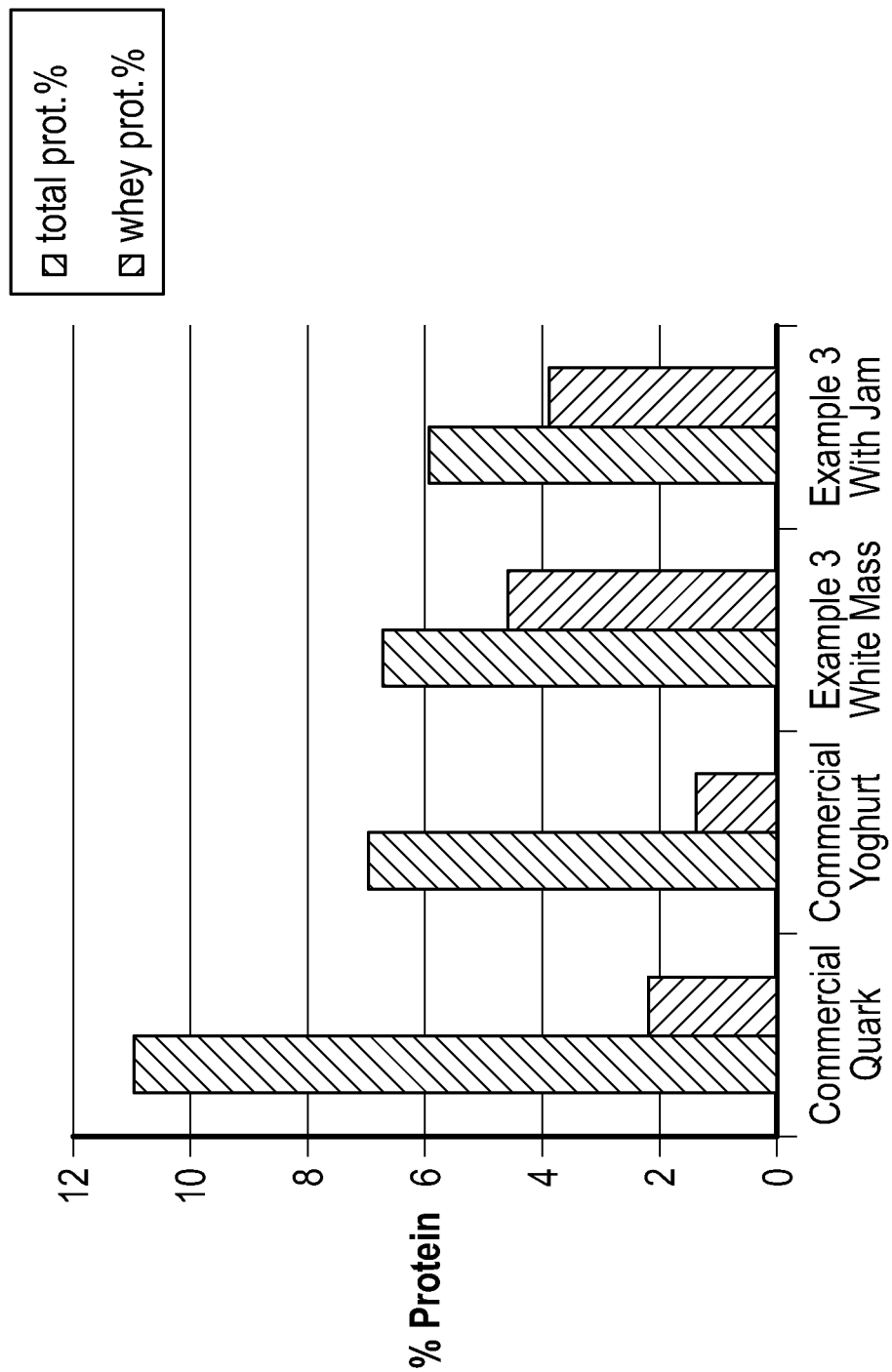

WHEY PROTEIN CONCENTRATE, ACIDIFIED MILK PRODUCTS COMPRISING THE CONCENTRATE AND METHODS THEREFOR

This application is the U.S. national phase of International Application No. PCT/FI2015/050926 filed 22 Dec. 2015, which designated the U.S. and claims priority to FI Patent Application No. 20146133 filed 22 Dec. 2014, the entire contents of each of which are hereby incorporated by reference.

FIELD OF THE INVENTION

The present invention relates to a method of producing an ideal whey protein concentrate. The present invention relates also to an ideal whey protein concentrate and its uses in in reducing the total milk protein content and/or in increasing the whey protein content of a spoonable acidified milk product. In addition, the present invention relates to a method of producing a spoonable acidified milk product having high whey protein content but a reduced total milk protein content. The present invention relates also to a spoonable acidified milk product having high whey protein content but a reduced total milk protein content.

BACKGROUND OF THE INVENTION

Currently commercially available spoonable acidified milk products, such as yogurts and quarks, contain milk protein about 4% and about 7-11%, respectively. In addition, the amount of whey protein in the currently commercially available spoonable acidified milk products is about 20% of the total milk protein content, which corresponds to the typical ratio of casein proteins to whey proteins in cow's milk.

Yogurt is an acidified milk product produced typically by lactic acid bacterial fermentation of milk. The bacteria used to make yogurt are known as "yogurt cultures". Fermentation of lactose by these bacteria produces lactic acid, which acts on milk protein to give yogurt its texture and its characteristic tang.

Quark is unripened fresh cheese which is made from pasteurized skim milk by adding an acidifier to the milk. Typically, a small amount of rennet is also added. The ratio of casein proteins to whey proteins in quark is about 80:20. Quark has a smooth texture and mild, acid flavour. Quark products presently in the market are typically spoonable and firm in texture.

It has been very challenging to manufacture spoonable acidified milk protein products having reduced protein content, such as yogurts containing proteins about 3% or less, without addition of hydrocolloids, in an industrial scale using the methods known in the art.

Patent publication WO 2005/041677 discloses a method for producing low fat spread, wherein a heat treated aqueous whey protein solution is used as a stabilizer.

Methods for producing spoonable acidified milk protein products having reduced total milk protein content and at the same time high whey protein content are required for fulfilling the increasing commercial need of such acidified milk products.

BRIEF DESCRIPTION OF THE INVENTION

An object of the present invention relates to a method for producing an ideal whey protein concentrate. Another object of the present invention relates to an ideal whey protein concentrate.

An object of the present invention relates to a method for producing a spoonable acidified milk product having high whey protein content but a reduced total milk protein content. Another object of the present invention relates to a spoonable acidified milk product having high whey protein content but a reduced total milk protein content.

In addition, an object of the present invention relates to a use of an ideal whey protein solution or an ideal whey protein concentrate in the reduction of the total protein content of a spoonable acidified milk product. The present invention also relates to the use of an ideal whey protein solution or an ideal whey protein concentrate in increasing the whey protein content of a spoonable acidified milk product.

The objects of the invention are achieved by methods, products and uses characterized by what is stated in the independent claims. The preferred embodiments of the invention are disclosed in the dependent claims.

BRIEF DESCRIPTION OF THE FIGURES

FIG. 1 show the amount of the total protein and the amount of whey protein in typical commercially available quark and yoghurt products as well as the corresponding ones produced according to the present invention in Example 3.

DETAILED DESCRIPTION OF THE INVENTION

It has been very challenging to manufacture spoonable acidified milk products having a reduced protein content, such as yogurts containing proteins about 3% or less, or quark type products containing proteins less than about 7% in an industrial scale using the methods known in the art.

The present invention is based on a finding that when an ideal whey protein solution containing whey proteins about 70-90% and casein about 10-30% of the total milk proteins and having a pH value in the range of 6.8-7.5, was heated to a temperature of about 88-95° C. for about 1-10 minutes, and then mixed with the conventional/typical starting ingredients of a spoonable acidified milk product, such as yogurt or quark, the total protein content of the acidified milk product was reduced whereas the whey protein content of the acidified milk product was increased compared to a corresponding conventional acidified milk product. Accordingly, using the method of the present invention spoonable acidified milk products containing less protein than the currently commercially available products can be produced. In addition, using the method of the present invention, spoonable acidified milk products containing more whey proteins than the currently commercially available products can be produced. In particular, using the method of the present invention, it is possible to produce spoonable acidified milk products containing whey proteins at least about 30% by weight of the total milk proteins of the product. Specifically, using the method of the present invention, it is possible to produce spoonable yogurts containing milk proteins about 3 w-%, at the maximum, whereas the currently commercially available yogurts typically contain milk proteins at least about 4 w-%. Using the method of the present invention, it is possible to produce quark or quark-type products containing milk proteins about 7 w-%, at the maximum, wherein the currently commercially available quark products typically contain protein about 11-12 w-%. In addition, using the method of the present invention, it is possible to produce yogurts and quark or quark-type products containing whey proteins at least about 30% by weight of the total milk proteins of the product, whereas the currently commercially available products contain whey proteins typically only about 20% by weight. Accordingly, using the method of the present invention spoonable acidified milk products containing at least 25% less milk proteins than the currently commercially available acidified milk products can be produced. Further, using the method of the present invention spoonable acidified milk products containing at least 50% more whey proteins than the currently commercially available acidified milk products can be produced. The nutritional quality of the products of the present invention is advantageous especially for children because the ratio of whey and casein proteins of the product of the present invention correspond to that of the breast milk. Further, the amino acid composition of the ideal whey protein solution as well as the ideal whey protein concentrate is close to that of the breast milk. Additionally, from the nutritional point of view low protein products are recommended to infants below 3 years. In addition, the nutritional quality of the products of the present invention is advantageous for athletes because of the high proportion of the whey proteins in the product.

Whey is a by-product of the cheese-making process, and it can be further processed to whey protein concentrate (WPC) and to whey protein isolate (WPI). They are described in terms of their protein concentration, protein content as percentage of dry matter, which ranges from 25 to 85% and >90%, respectively. WPC and WPI have been exposed to heat treatment process twice, chemical modification and pH regulation during the production of cheese and whey. Each of these heat treatment, chemical modification and pH regulation steps damages/denatures the whey proteins. The damaged proteins are then filtered out and what remains is a narrow range of "undenatured" proteins that have survived the cheese and whey manufacturing process. WPC and WPI contain caseinomacropeptides (14-17% of total protein) and thermally formed κ-casein β-lactoglobulin complexes as by-products.

The ideal whey protein concentrate of the present invention is based on an ideal whey protein solution which is prepared by microfiltering skim milk and concentrating the obtained microfiltration permeate by ultrafiltration. Accordingly, the ideal whey protein solution is an ultrafiltration retentate of the microfiltration permeate of skim milk. Microfiltration of the skim milk is typically carried out at a temperature of about 2° C. to about 55° C. In one embodiment, the microfiltration is performed in a temperature below 20° C. In another embodiment the microfiltration is performed in a temperature range of 2° C. to 20° C. In a further embodiment the temperature during microfiltration is in the range of 10° C. to 14° C. In an embodiment, the microfiltration is carried out at about 10° C. Ultrafiltration is typically performed at about 5° C. to about 55° C. In one embodiment, the ultrafiltration is performed in a temperature below 20° C. In another embodiment the ultrafiltration is performed in a temperature range of 2° C. to 20° C. In a further embodiment the temperature during ultrafiltration is in the range of 10° C. to 14° C. In an embodiment, the ultrafiltration is carried at about 10° C. The ideal whey protein solution contains whey proteins about 70-90% and casein about 10-30% of the total milk proteins. Preferably, the ideal whey protein solution contains whey proteins about 80-90%. The ideal whey protein solution contains β-casein, but it contains other casein monomers to a lesser extent than milk. Further, it is free of caseinomacropeptides and thermally formed κ-casein β-lactoglobulin complexes. It may contain traces of fat. The protein content of the ideal whey protein solution can range from about 4% to about 25%. The ideal whey protein solution has only been exposed to mild heat treatment and thus the proteins are essentially native. The casein content of the total milk proteins in the ideal whey protein solution is about 10-30%, of which about 50-80% is β-casein. In an embodiment, the content of β-casein is about 5-30% of the total milk proteins. In an embodiment, the protein content of the ideal whey protein solution is about 9%. In one embodiment, the content of β-casein in the ideal whey protein solution is about 20% based on total protein. The lactose content of the ideal whey protein solution can be reduced, if desired. The lactose removal can be accomplished with methods known in the art, for example. The ideal whey protein solution contains more α-lactalbumin (α-LA) and β-lactoglobulin (β-LG) in total whey protein than WPC or WPI manufactured from cheese whey because the caseinomacropeptide fraction does not exist in ideal whey protein solution. In addition, the amino acid composition of the ideal whey protein solution resembles that of the breast milk.

The ideal whey protein concentrate contains whey proteins about 70-90% and casein about 10-30% of the total milk proteins. Preferably, the ideal whey protein concentrate contains whey proteins about 80-90%. The ideal whey protein concentrate contains β-casein, but it contains other casein monomers to a lesser extent than milk. Further, it is free of caseinomacropeptides and thermally formed κ-casein β-lactoglobulin complexes. The ideal whey protein concentrate contains more α-lactalbumin (α-LA) and β-lactoglobulin (β-LG) in total whey protein than concentrates based on WPC or WPI. The casein content of the total milk proteins in the ideal whey protein concentrate is about 10-30%, of which about 50-80% is β-casein. In an embodiment, the content of β-casein is about 5-30% of the total milk proteins. The protein content of the ideal whey protein concentrate can range from about 4% to about 25%. In one embodiment, the ideal whey protein concentrate contains proteins 8.5-9.2% of which 6.4-7.6% are whey proteins and 1.1-2.7% casein (of which about 50-80% is β-casein), lactose 2.4-3.0%, ash 0.48-1.14%, dry matter 11.8-12.7%, sodium 260-310 mg/kg, potassium 1100-300 mg/kg, calcium 500-580 mg/kg, magnesium 90-110 mg/kg, chloride 320-460 mg/kg, phosphorus 370-460 mg/kg. In one embodiment, the ideal whey protein concentrate contains proteins 8.8% of which 6.9% are whey proteins and 1.7% casein, lactose 2.7%, ash 0.54%, dry matter 12.1%, sodium 300 mg/kg, potassium 1250 mg/kg, calcium 560 mg/kg, magnesium 100 mg/kg, chloride 410 mg/kg, phosphorus 430 mg/kg. In one embodiment, the ideal whey protein concentrate is not subjected to an additional calcium depletion treatment, such as ion exchange, for example.

The ideal whey protein concentrate can be used in the method of the present invention in a powder form or as a liquid. In one embodiment, the ideal whey protein concentrate is used in a liquid form. The functional properties of the whey proteins are better maintained when the drying step does not exist in the manufacturing process of the ideal whey protein concentrate.

Accordingly, the present invention relates to a method of producing an ideal whey protein concentrate comprising the steps of:

providing an ideal whey protein solution containing whey proteins about 70-90% and casein about 10-30% of the total protein;

adjusting the pH of the solution to pH 6.8-7.5;

heat-treating the solution at a temperature of 88-95° C. for 1-10 minutes to provide an ideal whey protein concentrate;

optionally cooling the concentrate to a temperature of about 4-45° C.;

optionally storing the concentrate at a temperature of about 4-8° C.

In the method of producing the ideal whey protein concentrate, the pH is adjusted to the range of 6.8-7.5. In one embodiment, the pH of the ideal whey protein concentrate is adjusted to the range of 6.8-7.3. In one embodiment, the pH of the ideal whey protein concentrate is adjusted to the range of 7-7.5. In the present invention, it is important that the pH is adjusted to a value above the isoelectric point of the whey proteins in order to keep them soluble.

In the method of producing the ideal whey protein concentrate of the present invention, the step of heat-treating the ideal whey protein solution is performed at the temperature of 88-95° C. for 1-10 minutes. In one embodiment, the heat-treatment is performed at the temperature of 90-95° C. In one embodiment, the heat-treatment is performed at the temperature of about 92° C. for 5 minutes. In the step of heat-treating the ideal whey protein solution, the whey proteins are denatured. If the thermal/heat load during the step of heat-treating is too high, the whey proteins will also form aggregates. Accordingly, in the present invention it is important that the whey proteins denature but do not form aggregates as a result of the heat-treatment.

In one embodiment of the method of producing the ideal whey protein concentrate, in the step of cooling the ideal whey protein concentrate, the concentrate is cooled to a temperature from 4° C. to 45° C. In one embodiment, the ideal whey concentrate is cooled to a temperature of 4-8° C.

The method of producing an ideal whey protein concentrate may further comprise additional process steps such as diluting the ideal whey solution before the heat treatment step. In one embodiment, the dilution is done by mixing the ideal whey solution with water, UF-permeate, protein free ingredient, lactose concentrate, RO-retentate and/or RO-permeate. The method of producing an ideal whey protein concentrate may also comprise an additional step of adjusting the pH of the solution back to pH about 6.7-6.8 before the storage of the concentrate.

The pH of the ideal whey protein concentrate of the present invention is in the range of 6.8-7.5 and about 70-90% of the total proteins are whey proteins and about 10-30% are casein proteins. In one embodiment, about 50-80% of casein is β-casein. In one embodiment, the pH of the ideal whey protein concentrate of the present invention is in the range of 6.8-7.5. In one embodiment, the pH of the ideal whey protein concentrate of the present invention is in the range of 6.8-7.3. In one embodiment, the pH of the ideal whey protein concentrate of the present invention is in the range of 7-7.5. In one embodiment, about 80-90% of the total proteins are whey proteins. In one embodiment, about 20-30% are casein proteins. In one embodiment, the milk protein content of the concentrate is about 8-11 w-%. In another embodiment, the milk protein content of the concentrate is about 9 w-%.

The present invention relates also to a method of producing a spoonable acidified milk protein product comprising the steps of:

providing typical starting ingredients for a spoonable acidified milk product;

heat-treating the ingredients;

providing an ideal whey protein concentrate having pH 6.8-7.5;

combining/mixing the heat-treated ingredients and the ideal whey protein concentrate and;

acidifying the mixture to provide a spoonable acidified milk product having a pH in the range of about 4.0 to about 4.8.

The method may also comprise the additional optional steps of cooling the acidified product and/or packing the product, or alternatively packing the mixture before the acidification step and/or cooling the product.

In addition, the present invention relates to a method of producing a spoonable acidified milk protein product comprising the steps of:

providing an ideal whey protein solution having whey proteins about 70-90% of the total protein;

adjusting the pH of the solution to pH 6.8-7.5;

heat-treating the solution at the temperature of 88-95° C. for 1-10 minutes to provide an ideal whey protein concentrate;

optionally cooling the concentrate;

providing the typical starting ingredients for a spoonable acidified milk product;

heat-treating the starting ingredients;

combining/mixing the ideal whey protein concentrate and the heat-treated ingredients;

acidifying the mixture to provide a spoonable acidified milk product having pH in the range of about 4.0 to about 4.8;

optionally cooling the acidified product optionally packing the product.

In one embodiment of the method of producing the spoonable acidified milk protein product, in the step of cooling the ideal whey protein concentrate, the concentrate is cooled to a temperature from 4° C. to 45° C. In one embodiment of the method of producing the spoonable acidified milk protein product, in the step of cooling the acidified milk product, the product is cooled to a temperature from 4° C. to 45° C.

The spoonable acidified milk protein product of the present invention has a pH value in the range of about 4.0 to about 4.8. In one embodiment, the spoonable acidified milk protein product of the present invention has a pH value in the range of about 4.5 to about 4.8. In one embodiment, the spoonable acidified milk protein product of the present invention has a pH value in the range of about 4.0 to about 4.5. The spoonable acidified milk protein product of the present invention has a viscosity in the range of about 300 to about 12 000 mPas. In one embodiment, the spoonable acidified milk protein product of the present invention has a viscosity in the range of about 300 to about 2 000 mPas. In one embodiment, the spoonable acidified milk protein product of the present invention has a viscosity in the range of about 5000 to about 12 000 mPas. In one embodiment, the viscosities are determined with the shear rate 50, 1/s.

The spoonable acidified milk protein product can be selected from yogurts, quarks and quark-type products, for example.

In one embodiment of the invention, the spoonable acidified milk protein product is yogurt. In this embodiment, the present invention relates to a method for producing a spoonable yogurt comprising the steps of:

providing the starting ingredients for yogurt;

heat-treating the starting ingredients;

providing an ideal whey protein concentrate having pH 6.8-7.5;

combining/mixing the ideal whey protein concentrate and the heat-treated ingredients;
acidifying the mixture to provide a yogurt;
optionally cooling the yogurt;
optionally packing the yogurt.

In this embodiment, the present invention also relates to a method for producing a spoonable yogurt comprising the steps of:
providing an ideal whey protein solution having whey proteins about 70-90% of the total protein;
adjusting the pH of the solution to pH 6.8-7.5;
heat-treating the solution at the temperature of 88-95° C. for 1-10 minutes to provide an ideal whey protein concentrate;
optionally cooling the concentrate;
providing the typical starting ingredients for yogurt;
heat-treating the starting ingredients;
combining/mixing the ideal whey protein concentrate and the heat-treated ingredients;
acidifying the mixture to provide yogurt;
optionally cooling the yogurt;
optionally packing the yogurt.

The yogurt may a stirred yogurt or a set-type yogurt. Accordingly, in an alternative embodiment, the spoonable acidified milk protein product is a set-type yogurt. In this embodiment, the method comprises the steps of:
providing the starting ingredients for yogurt;
heat-treating the starting ingredients;
providing an ideal whey protein concentrate having pH 6.8-7.5;
combining/mixing the ideal whey protein concentrate and the heat-treated ingredients;
packing the mixture with an acidifier
acidifying the mixture to provide a yogurt in the package;
optionally cooling the yogurt.

In this alternative embodiment, the method for producing a spoonable yogurt may comprise the steps of:
providing an ideal whey protein solution having whey proteins about 70-90% of the total protein;
adjusting the pH of the solution to pH 6.8-7.5;
heat-treating the solution at the temperature of 88-95° C. for 1-10 minutes to provide an ideal whey protein concentrate;
optionally cooling the concentrate;
providing the typical starting ingredients for yogurt;
heat-treating the starting ingredients;
combining/mixing the ideal whey protein concentrate and the heat-treated ingredients;
packing the mixture with an acidifier;
acidifying the mixture to provide a yogurt in the package;
optionally cooling the yogurt.

In one embodiment of the invention, the spoonable acidified milk protein product is quark or a quark-type product. In the present invention the term "quark" refers also to tvorog and skyr. In the present invention, the term a quark-type product refers to an acidified milk protein product which has a thickness similar to quark, but which is not classified as quark in the legislation. In one embodiment, the present invention relates to a method for producing a quark or a quark type product comprising the steps of:
providing the typical starting ingredients for a quark or a quark type product;
heat-treating the starting ingredients;
providing an ideal whey protein concentrate having pH 6.8-7.5;
combining/mixing the ideal whey protein concentrate and the heat-treated ingredients;
optionally treating with rennet and/or chymosin;
acidifying the mixture to provide a quark or quark type product;
optionally cooling the quark or quark type product;
optionally packing the quark or quark type product.

In the step of treating with rennet and/or chymosin, the addition of rennet and/or chymosin may be performed before, after or simultaneously with the acidification step.

In this embodiment, the present invention relates also to a method for producing a quark or a quark type product comprising the steps of:
providing an ideal whey protein solution having whey proteins about 70-90% of the total protein;
adjusting the pH of the solution to pH 6.8-7.5;
heat-treating the solution at the temperature of 88-95° C. for 1-10 minutes to provide an ideal whey protein concentrate;
optionally cooling the concentrate;
providing the typical starting ingredients for a quark or a quark type product;
heat-treating the starting ingredients;
combining/mixing the whey protein concentrate and the heat-treated ingredients;
acidifying the mixture to provide a quark or quark type product;
optionally cooling the quark or quark type product;
optionally packing the quark or quark type product.

In one embodiment, the method of producing a spoonable acidified milk product does not comprise addition of a hydrocolloid, such as gelatine, starch, locust bean gum, carrageenan, guar gum, pectin, for example.

The conventional and/or typical starting ingredients for yogurt manufacturing include skim milk and optionally cream, vegetable oil, water and other milk-based ingredients. The conventional and/or typical starting ingredients for quark manufacturing include skim milk and optionally cream, vegetable oil, water and other milk-based ingredients. The conventional and/or typical starting ingredients for yogurt and quark manufacturing are known to a person skilled in the art.

In the method of producing a spoonable acidified milk protein product of the present invention, the step of heat-treating the ideal whey protein solution is performed at the temperature of 88-95° C. for 1-10 minutes. In one embodiment, the heat-treatment is performed at the temperature of 90-95° C. In one embodiment, the heat-treatment is performed at the temperature of about 92° C. for 5 minutes. In the method of producing a spoonable acidified milk protein product of the present invention, the step of heat-treating the typical starting ingredients is performed in the manner known in the art. Examples of heat treatment processes useful for the process of the invention are pasteurization, high pasteurization, heating at a temperature lower than the pasteurization temperature for a sufficiently long time, thermisation, i.e., heating for at least 15 s at approximately 57 to 68° C., UHT, HT, and ESL treatments. In UHT, the raw material is heated at approximately 135 to 140° C. for 2 to 4 s. HT ("short UHT treatment") is described in published patent application WO 2010085957. In ESL, the raw material is heated at approximately 127 to 135° C. for less than 2 s. In pasteurization, the raw material is heated at approximately 70 to 72° C. at least for 15 s, and in high pasteurization, the raw material is heated at approximately 95° C. at least for 5 min. Heat treatment may also be a combination of different techniques.

In the method of producing a spoonable acidified milk protein product of the present invention, the step of acidifying may be performed by adding a biological starter specific to each product type (e.g. bulk starter or direct to vat starter DVI/DVS), a chemical starter, or organic or inorganic acids with or without rennet. For instance, the *Lactobacillus bulgaricus* and *Streptococcus thermophiles* strains are conventionally used in yogurt production. Examples of suitable organic acids include glucono-delta-lactone (GDL), calcium lactate, citric acid, and lactic acid. The used acid is preferably glucono-delta-lactone.

The acidified milk products prepared by the process of the invention can be acidified either in a tank before packaging the product or immediately after packaging in a consumer or food service package.

The method of producing a spoonable acidified milk protein product of present invention may further comprise additional process steps such as homogenization, separation, flavouring, cooling, packaging and/or product recovery specific to the product being prepared. The homogenization is conventionally done by using either one- or two-phase homogenizers, and the typical homogenization conditions are a temperature of 55 to 80° C., more typically of 65 to 70° C. and a pressure of 100 to 500 bar, more typically of 150 to 200 bar.

The spoonable acidified milk protein product of the present invention contains less proteins than the currently commercially available spoonable acidified products. The spoonable acidified milk protein product of the present invention contains more whey proteins than the currently commercially available products. In one embodiment, the spoonable acidified milk protein product of the present invention contains whey proteins at least about 30% by weight of the total milk proteins in the product. In one embodiment, the spoonable acidified milk protein product contains whey proteins at least about 50% by weight of the total milk proteins in the product. In one embodiment, the product contains whey proteins about 50-80% by weight of the total milk proteins in the product. In another embodiment, the product contains whey proteins about 65-70% by weight of the total milk proteins in the product. Further, the yogurts of the present invention contain milk proteins about 3 w-%, at the maximum, and the quark or quark-type products contain milk proteins about 7 w-%, at the maximum whereas the currently commercially available yogurts and quark products typically contain milk proteins at least about 4 w-%. and about 11-12 w-%, respectively. In one embodiment, the spoonable acidified products of the present invention contain at least 25% less milk proteins than the currently commercially available acidified milk products. Further, the products of the present invention contain at least 50% more whey proteins than the currently commercially available acidified milk products. The nutritional quality of the products of the present invention is advantageous especially for children because the ratio of whey and casein proteins of the product of the present invention correspond to that of the breast milk. Further, the amino acid composition of the product of the present invention is close to that of the breast milk.

The texture of the products of the present invention is solid and thick. This is mainly because of the behaviour of the separately heat-treated whey proteins which are forming a gel-like thick texture during the lowering of the pH in the subsequent acidification step.

In one embodiment, the spoonable acidified milk product is free from hydrocolloids, such as gelatine, starch, locust bean gum, carrageenan, guar gum, pectin, for example.

The present invention relates also to a use of an ideal whey protein solution or an ideal whey protein concentrate in the reduction of the total protein content of a spoonable acidified milk product. The present invention also relates to the use of an ideal whey protein solution or an ideal whey protein concentrate in increasing the whey protein content of a spoonable acidified milk product.

The following examples are given to further illustrate the invention without, however, restricting the invention thereto.

EXAMPLE 1

Preparation of Ideal Whey Protein Solution

Skimmed milk was microfiltered with polymeric microfiltration membranes of 800 kDa (Synder FR-3A-6338) at 10° C. The microfiltration was performed with a concentration factor of 16.5 to provide an ideal casein solution as a microfiltrate retentate. The microfiltration permeate obtained from the microfiltration was concentrated by ultrafiltration with an ultrafiltration membrane of 10 kDa (Koch HFK-131 6438-VYT) and with a concentration factor of 36 at 10° C. to provide an ideal whey solution as an ultrafiltration retentate. The protein content of the ideal whey solution was 9%. β-casein content is about 20% based on total protein.

EXAMPLE 2

Preparation of an Infant Yogurt

Infant yogurt was made by separate pasteurization of yogurt milk and an ideal whey protein solution. The final compositions are given below:

| Ingredients | Formulation 1 | Formulation 2 |
|---|---|---|
| Cream (35% fat) | 5% | 10% |
| Skimmed milk | 45% | 42.5% |
| Lactose concentrate (lactose 15.8-21.8%, ash 0.52-1.19%) | 22% | 22% |
| Whey protein concentrate | 17.3% | 17.3% |
| Vegetable oil | 1.8% | 0% |
| RO-retentate (ash 1.86-1.97% | 2.9% | 0% |
| Water | 6% | 8.2% |

The ideal whey protein solution was mixed with water, and its pH was adjusted with 20% KOH to pH 7.3 prior to pasteurization at 92° C. for 5 minutes. All other ingredients were mixed, in Formulation 1 pre-homogenized with Ystral mixer, pre-heated to 60° C., homogenized at 400 bar and pasteurized at 92° C. for 5 minutes. Pasteurized whey protein concentrate was mixed with yogurt milk and fermented at 42° C. about 5 hours until pH was 4.55. The yogurts were hand mixed and subsequently cooled down. A reference sample was made, where all ingredients were mixed and pasteurized together.

The viscosities and wheying off behavior of the yoghurts was determined. Those produced by the method of the invention had a structure typical for stirred yoghurt, whereas the reference yoghurts were very fluid. The total protein content of the yogurts produced by the method of the invention was 3.3%, of which 50% was whey protein.

| Sample | Viscosity (mPas) | Whey separation |
|---|---|---|
| Formulation 1 | 815 | +++ |
| Reference 1 | 16 | – |
| Formulation 2 | 870 | – |
| Reference 2 | 97 | – |

EXAMPLE 3

Preparation of a Creamy Yogurt

A creamy yogurt was made by separate pasteurizations of yogurt milk and an ideal whey protein solution. A reference without whey protein concentrate was made:

| Ingredients | Formulation 1 | Reference 1 |
|---|---|---|
| UF retentate (11.5-11-9% protein, lactose 4.2-4.4%, 1.37-1.41% ash) | 15% | 20.8% |
| Cream (35% fat) | 8.8% | 8.6% |
| Milk | 61.1% | 64.5% |
| Lactose concentrate | 6.1% | 6.1% |
| Whey protein concentrate | 9% | 0% |

The ideal whey protein solution was mixed with water, and its pH was adjusted with 20% KOH to pH 7.3 prior to pasteurization at 9° C. for 5 minutes. All other ingredients were mixed, pre-heated to 60° C., homogenized at 400 bar and pasteurized at 92° C. for 5 minutes. Pasteurized whey protein concentrate was mixed with yoghurt milk and fermented at 42° C. about 5 hours until pH was 4.6. The yoghurts were hand mixed and subsequently cooled down. A reference sample was made, where all ingredients were mixed and pasteurized together.

The viscosities and wheying off behavior of the yoghurts was determined. The yogurt produced by the method of the invention was very viscous and contained less titratable acids as compared with the reference. The total protein content of the yogurt produced by the method of the invention was 5% of which 30% was whey protein.

| Sample | Viscosity (mPas) | Titratable acidity SH |
|---|---|---|
| Formulation 1 | 1870 | 43.8 |
| Reference 1 | 484 | 45.8 |

EXAMPLE 4

A Quark-Type Product

A quark-type product, which has lower protein content than normal quark, but higher share of good whey proteins, which is suitable for active exercising people, was prepared as follows:

Ideal whey protein solution, which has the total protein concentration at least 8%, was heat-treated at 90° C. for 5 min. After the heat-treatment the whey was mixed with pasteurized milk (f.ex. 0-3.5% fat) to get a mixture of about 30-35% casein and 65-70% whey protein. The total protein content was about 6.7%.

The mixture was heated up to 42° C. and fermented 4.5-5 h to reach pH 4.55-4.6.

The gelled product was mixed by hand or using a kitchen mixer (Pamix) and cooled down to ambient temperature. The mixed product was homogenized at 80 bar to get a smooth velvet-like texture which had a viscosity of 11700 mPas.

The product was flavored by mixing a suitable jam or fruit/berry preparation in the product. The added amount was about 12-15%.

The share of casein and whey proteins were compared with those of a commercial high protein yoghurt (total protein 7%) and high protein quark (total protein 11%) made of regular milk with the normal casein/whey protein ratio (80/20). The results are shown in FIG. 1.

This type of a product is ideal for exercising people, who need a lot of protein but less calories.

It will be obvious to a person skilled in the art that, as the technology advances, the inventive concept can be implemented in various ways. The invention and its embodiments are not limited to the examples described above but may vary within the scope of the claims.

The invention claimed is:

1. A method of producing an ideal whey protein concentrate comprising the steps of:
   microfiltering skim milk to provide a microfiltration permeate and concentrating the resultant microfiltration permeate by ultrafiltration to provide an ideal whey protein solution as an ultrafiltration retentate, wherein the ideal whey protein solution contains whey proteins about 70-90% and caseins about 10-30% of the total protein;
   adjusting the pH of the solution to pH 7.0-7.5;
   heat-treating the solution at a temperature of 88-95° C. for 1-10 minutes to provide an ideal whey protein concentrate;
   optionally cooling the concentrate; and
   optionally storing the concentrate at a temperature of 4-8° C.

2. The method of claim 1, wherein the pH of the solution is adjusted to pH 7.0-7.3.

3. The method of claim 1, wherein about 50-80% of the caseins is β-casein.

4. The method of claim 1, wherein the pH adjustment is carried out prior to the heat treatment.

5. The method of claim 1, wherein the idea whey protein concentrate is dried to powder.

6. A method of producing a spoonable acidified milk product comprising the steps of:
   microfiltering skim milk to provide a microfiltration permeate and concentrating the resultant microfiltration permeate by ultrafiltration to provide an ideal whey protein solution as an ultrafiltration retentate, wherein the ideal whey protein solution has whey proteins about 70-90% and caseins about 10-30% of the total protein;
   adjusting the pH of the solution to pH 7.0-7.5;
   heat-treating the solution at the temperature of 88-95° C. for 1-10 minutes to provide an ideal whey protein concentrate;
   optionally cooling the concentrate;
   providing typical starting ingredients including skim milk and optionally cream, vegetable oil, water and other milk-based ingredients for a spoonable acidified milk product;
   heat-treating the starting ingredients;
   combining/mixing the ideal whey protein concentrate and the heat-treated ingredients; and acidifying the mixture to provide a spoonable acidified milk product having a pH value in the range of about 4.0 to about 4.8 and a viscosity in the range of about 300 to about 12000 mPas, wherein the spoonable acidified milk product is a yogurt containing proteins about 3% or less, or wherein the spoonable acidified milk product is a quark or a quark-type product containing proteins less than about 7%.

7. The method of claim 6, wherein the pH is adjusted to pH 7.0-7.3.

8. The method of claim 6, wherein the pH adjustment is carried out prior to the heat treatment of the ideal whey protein solution.

9. The method of claim 6, wherein about 50-80% of the caseins is β-casein.

10. The method of claim 6, wherein the spoonable acidified milk product contains whey proteins at least 50% by weight of the total milk proteins in the product.

11. The method of claim 6, wherein the method does not contain addition of a hydrocolloid.

12. The method of claim 6, wherein the viscosity is in the range of about 300 to 2000 mPas.

13. The method of claim 6, wherein the viscosity is in the range of about 5000 to about 12000 mPas.

14. A method of using an ideal whey protein concentrate having a pH in the range of 7.0-7.5 and having about 70-90% of whey proteins and 10-30% of caseins based on the total proteins in reducing the total milk protein content of a spoonable acidified milk product, wherein the method comprises microfiltering skim milk to provide a microfiltration permeate and concentrating the resultant microfiltration permeate by ultrafiltration to provide an ideal whey protein solution as an ultrafiltration retentate, wherein the ideal whey protein solution contains whey proteins about 70-90% and caseins about 10-30% of the total protein;

adjusting the pH of the solution to pH 7.0-7.5;

heat-treating the solution at a temperature of 88-95° C. for 1-10 minutes to provide an ideal whey protein concentrate;

optionally cooling the concentrate;

optionally storing the concentrate at a temperature of 4-8° C.; and combining or mixing the ideal whey protein concentrate with heat treated typical starting ingredients including skim milk optionally cream, vegetable oil, water and other milk-based ingredients for a spoonable acidified milk product prior to acidifying the formed mixture.

15. A method of using an ideal whey protein concentrate having a pH in the range of 7.0-7.5 and having about 70-90% of whey proteins and 10-30% of caseins based on the total proteins in increasing the whey protein content of a spoonable acidified milk product, wherein the method comprises microfiltering skim milk to provide a microfiltration permeate and concentrating the resultant microfiltration permeate by ultrafiltration to provide an ideal whey protein solution as an ultrafiltration retentate, wherein the ideal whey protein solution contains whey proteins about 70-90% and caseins about 10-30% of the total protein;

adjusting the pH of the solution to pH 7.0-7.5;

heat-treating the solution at a temperature of 88-95° C. for 1-10 minutes to provide an ideal whey protein concentrate;

optionally cooling the concentrate;

optionally storing the concentrate at a temperature of 4-8° C.; and combining or mixing the ideal whey protein concentrate with heat treated typical starting ingredients including skim milk optionally cream, vegetable oil, water and other milk-based ingredients for a spoonable acidified milk product prior to acidifying the formed mixture.

16. The method of claim 14, wherein about 50-80% of the caseins in the concentrate is β-casein.

17. The method of claim 15, wherein about 50-80% of the caseins in the concentrate is β-casein.

18. The method of claim 14, wherein the spoonable acidified milk product is a yogurt or a quark or a quark-type product.

19. The method of claim 15, wherein the spoonable acidified milk product is a yogurt or a quark or a quark-type product.

* * * * *